United States Patent [19]
Fischer et al.

[11] Patent Number: 6,101,982
[45] Date of Patent: Aug. 15, 2000

[54] METHOD AND APPARATUS FOR PREHEATING THE FUEL FOR A FIRING PLANT

[75] Inventors: Kurt Fischer, Mellingen, Switzerland; Ralf Kuske, Höchenschwand; Erhard Liebig, Laufenburg, both of Germany

[73] Assignee: Asea Brown Boveri AG, Baden, Switzerland

[21] Appl. No.: 09/182,868

[22] Filed: Oct. 30, 1998

[30] Foreign Application Priority Data

Nov. 19, 1997 [EP] European Pat. Off. .............. 97810879

[51] Int. Cl.$^7$ ...................................................... F22B 33/00
[52] U.S. Cl. ............................................ 122/1 R; 122/7 R
[58] Field of Search ................................... 122/1 R, 7 R; 60/39, 182, 736

[56] References Cited

U.S. PATENT DOCUMENTS 5,267,608   12/1993   Coffinberry .
5,357,746   10/1994   Myers .

FOREIGN PATENT DOCUMENTS

0391082A2   10/1990   European Pat. Off. .
4321081A1   1/1995    Germany .
19512466C1  8/1996    Germany .
19544226A1  6/1997    Germany .

*Primary Examiner*—Denise L. Ferensic
*Assistant Examiner*—Jiping Lu
*Attorney, Agent, or Firm*—Burns, Doane, Swecker & Mathis, L.L.P.

[57] ABSTRACT

A method and an arrangement for preheating the fuel for a firing plant which is operated with liquid or gaseous fuel, which is fed to the firing plant via a feed line, having at least one heat-exchanger unit which is thermally coupled to the feed line and through which heat is transferred from a heating medium, which is directed in a heating circuit, to the fuel.

The invention is distinguished by the fact that the pressure at which the fuel is directed in the feed line is greater than the pressure at which the heating medium is directed in the heating circuit, at least in the region of the heat exchanger.

13 Claims, 1 Drawing Sheet

METHOD AND APPARATUS FOR PREHEATING THE FUEL FOR A FIRING PLANT

BACKGROUND OF THE INVENTION

1. Field of the Invention

The invention relates to a method and an apparatus for preheating the fuel for a firing plant which is operated with liquid or gaseous fuel, which is fed to the firing plant via a feed line, having at least one heat-exchanger unit which is thermally coupled to the feed line and through which heat is transferred from a heating medium, which is directed in a heating circuit, to the fuel.

2. Discussion of Background

Firing plants which have a burner unit and serve by means of specific feeding and combustion of gaseous and/or liquid fuel to heat a working medium, which in turn is utilized to generate energy or perform work, are improved by constant reworking and design optimization from the point of view of increasing the efficiency and/or the output of the combustion process.

DE 43 21 081 A1 discloses a typical representative of firing plants, namely a gas-turbine plant, having a combustion chamber, in which fuel is specifically introduced for the subsequent combustion and formation of hot gases driving the gas turbine. To increase the efficiency of the gas turbine and in particular of the combustion process, it is proposed to preheat the fuel to be directed into the combustion chamber to temperatures of between 100° C. and 400° C. To this end, a heat exchanger is provided in the fuel feed line. In this heat exchanger, a heating medium gives off heat to the fuel flowing in the fuel line.

The plant described in the abovementioned publication is in particular a combined gas/steam-turbine plant in which the flue gases issuing from the gas turbine are directed via an exhaust-gas line into a heat-recovery steam generator, the waste heat of which serves to preheat and deaerate the feedwater and to generate steam in a low-pressure stage and a high-pressure stage. Low-pressure steam and high-pressure steam are used in a steam turboset to generate electrical energy. The exhaust steam is precipitated in the condenser and the condensate is fed again to the heat-recovery steam generator.

For the preheating of the fuel fed in the fuel line of the gas turbine to the aforesaid desired temperature level, it is advisable to connect up the heat exchanger integrated in the fuel line with a feed line for the heating medium from the feedwater tank/deaerator and with a discharge line into the condensate line.

An essential aspect of the preheating of the fuel mentioned in the publication relates to the avoidance of the ingress of gaseous constituents of the fuel into the heating circuit, as a result of which the heating medium may be contaminated. Such contamination, which is relevant from the safety point of view, may be caused in particular by leakages in the heating areas. For this reason, the pressure on the side of the heating medium must be greater than the pressure of the fuel. Thus the ingress of fuel into the heating circuit can be ruled out. If any leakages occur, only a discharge of heating medium from the heating circuit can take place. To ensure the necessary pressure ratios, a pump which increases the pressure upstream of the heat exchanger is provided in the feed line of the heating medium to the heat exchanger. On the other side, a corresponding choke unit is provided in the discharge line, which choke unit readjusts the increased pressure to the conditions in the condensate line.

A disadvantage in this circuit variant is the pressure increase by means of a pump with subsequent pressure reduction in a choke unit.

An alternative variant provides for the heating medium to be bled from the outlet of the high-pressure economizer in order to ensure in this way that the pressure prevailing in the feed line of the heating medium is greater than the pressure to which the fuel in the fuel line is subjected. The heating medium is returned into the feedwater tank/deaerator and this return requires a corresponding choke device.

For energy reasons, the variant, described above, of the bleeding of the heating medium from the high-pressure stage of the heat-recovery boiler is not especially advantageous, since the high energy level, predetermined by pressure and temperature, of the heating medium should be utilized inside the steam turbine in order to generate energy and is not available for another use at a low energy level, such as, for example, for the preheating of the fuel.

SUMMARY OF THE INVENTION

Accordingly, one object of the invention is to provide a novel method and apparatus for preheating the fuel for a firing plant which is operated with liquid or gaseous fuel, which is fed to the firing plant via a feed line, having at least one heat-exchanger unit through which heat is transferred from a heating medium, which is directed in a heating circuit, to the fuel, in such a way that, at the lowest possible design and technical cost and while retaining the operating reliability achieved hitherto, specific preheating of the fuel is possible in order to increase the efficiency and output of the firing plant. The measures to be taken are to serve, in particular, to utilize plant-specific heat at the lowest possible pressure and temperature level for preheating the fuel.

The invention is based on the idea of providing a heat-exchanger unit in the feed line for the fuel in order to preheat the fuel for the operation of a firing plant, inside which heat exchanger unit the heating medium is subjected to a pressure which is less than the pressure at which the fuel is directed through the feed line into the firing plant.

The pressure setting according to the invention breaks away from the hitherto known idea for avoiding the inflow of fuel into the heating circuit due to leakages which may occur in the heat-exchanger unit. Although it is now possible with the pressure setting according to the invention for fuel to enter the heating circuit in the event of damage, such fuel contamination in the heating medium can nonetheless be completely removed again by separators or separating units connected downstream of the heat-exchanger unit.

Because it is possible for the pressure of the heating medium to be less than the pressure of the fuel, high-pressure hot water to which the heating circuit is thermally coupled is not needed.

In the case of the gas- and steam-turbine plant described above, this means that the heating circuit running through the heat-exchanger unit is coupled to the low-pressure system of the heat-recovery boiler. Corresponding partial-flow branching downstream of the low-pressure economizer into the heating circuit, on account of the relatively low temperature and pressure level, leads only to an insignificant reduced output of the steam turbine. If the preheating of the fuel is uniform, the efficiency of the firing plant increases in equal proportion.

The pressure setting according to the invention proves to be especially advantageous due to the fact that hot water can be used at a relatively low pressure level, as a result of which no additional pumps are required for the pressure increase in the heating circuit and no choke elements are required for the corresponding pressure reduction, as is the case, for example, in the abovementioned publication DE 43 21 081, for example in the exemplary embodiment according to FIG. 1.

Gaseous fuel is preferably fed to the firing plant, so that, on account of the required pressure ratios, the heating medium directed in the heating circuit can be contaminated with gaseous fuel if there are leakages. However, such contamination can be completely removed by means of suitable gas separators, so that the operation of the proposed preheating of the fuel corresponds to all the existing safety aspects. Conversely, it may be assumed that, on account of the set pressure ratios, contamination of the fuel with the heating medium can be ruled out.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing.

DESCRIPTION OF THE PREFERRED EMBODIMENTS

Figure 1:
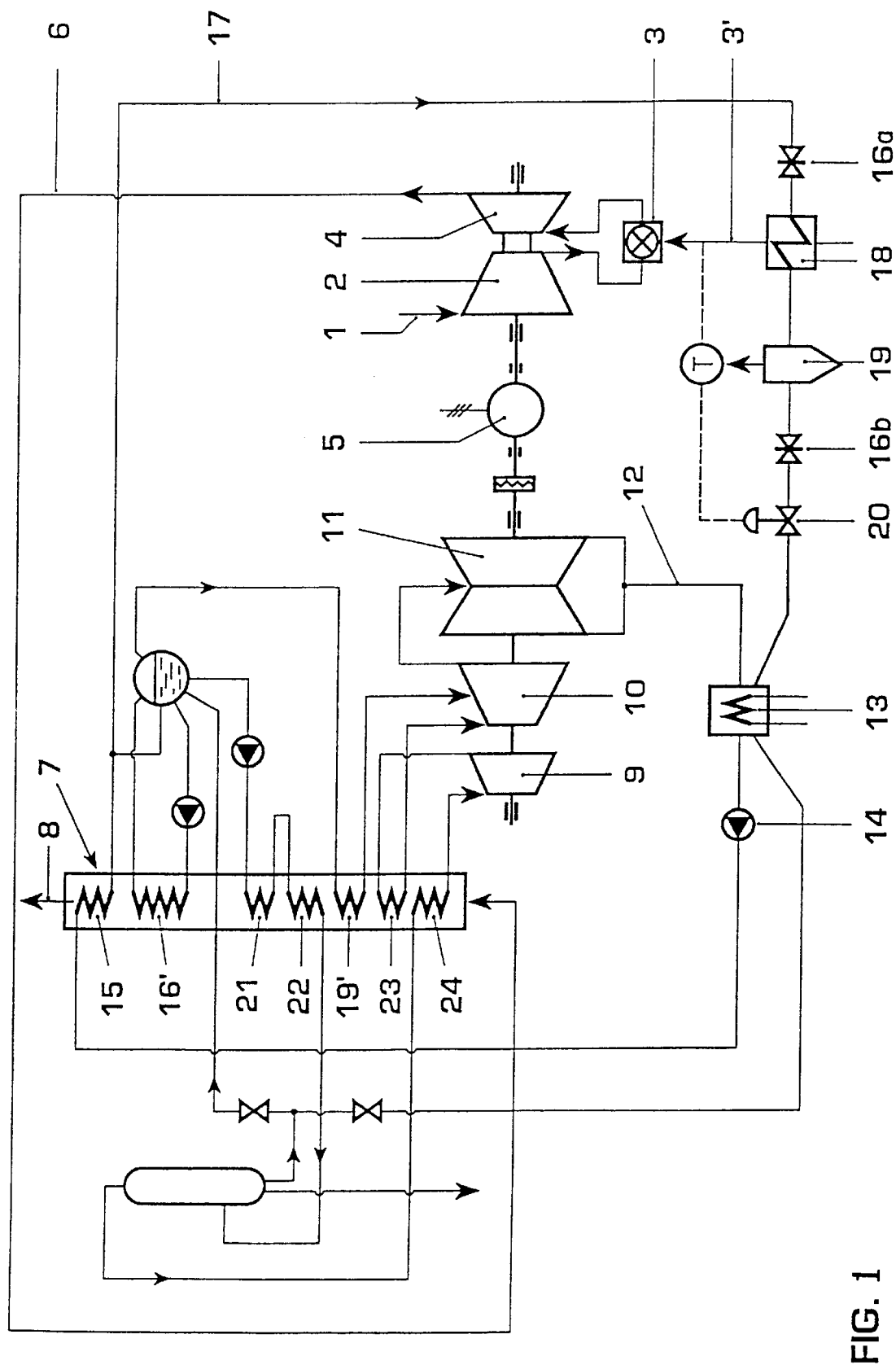

Referring now to the drawing, the single FIGURE shows a combined gas- and steam-turbine plant as disclosed in accordance with the basic construction by German Offenlegungsschrift DE 195 44 226 A1. The circuit components relevant to the idea behind the invention are described in each case below. All the other components which are not provided with reference numerals may be gathered from the aforesaid publication.

According to the single FIGURE, in the gas-turbine system, fresh air drawn in via a line 1 is compressed to the working pressure in a compressor 2. The compressed air is heated to a considerable degree in a combustion chamber 3, which is fired, for example, with natural gas, and the fuel gas which is thus produced is expanded in a gas turbine 4 to perform work. The energy which is generated in this process is delivered to a generator 5 and the compressor 2 respectively. The still hot exhaust gas of the gas turbine is fed to a heat-recovery steam-generating plant 7 via a line 6 from the outlet of the gas turbine and, after it has given off its heat, is directed from the heat-recovery steam-generating plant 7 into the open via a line 8 and a stack (not shown).

In the water/steam circuit, a multi-casing steam turbine 9, 10 and 11 is arranged on the same shaft with the gas turbine 4. The working steam expanded in the low-pressure turbine 11 condenses in a condenser 13. The condensate is delivered directly into the steam generator 7 by means of a condensate pump 14.

In the present case, the heat-recovery steam-generating plant 7 works according to a dual-pressure steam process.

The low-pressure system is constructed as a circulation system with drum, a forced-circulation system having been selected here. In the flue-gas path of the boiler, it comprises a low-pressure economizer 15, into which the condensate is directed, a low-pressure evaporator 16' and a low-pressure superheater 19'. The low-pressure evaporator 16' is connected to a drum via a circulating pump. The superheated steam is transferred via a low-pressure steam line into a suitable stage of the intermediate-pressure steam turbine 10.

The high-pressure system is constructed as a forced-circulation system and can thus be designed for both sub-critical and supercritical parameters. In the flue-gas path of the boiler, it essentially comprises the high-pressure economizer 21, the high-pressure evaporator 22 and the high-pressure superheater 23. The working medium is fed to the high-pressure economizer 21 from the low-pressure drum via a high-pressure feed pump. In this way, the hitherto conventional feedwater tank can be dispensed with. The superheated steam is transferred via a live-steam line 24 into the high-pressure part 9 of the steam turbine. After the partial expansion in the high-pressure part 9 of the turbine, the steam is reheated before being passed into the intermediate-pressure turbine 10.

According to the invention, a discharge line 17 from the low-pressure economizer 15 is provided, and the heating medium, which is typically subjected to a pressure of between about 8 and 10 bar, is fed via this discharge line 17, at temperatures in the order of magnitude of about 160 to 170° C., to a heat-exchanger unit 18, which, for preheating the fuel, is attached in the feed line 3'. Shut-off valves 16a and 16b, which can be shut off on the water side, are provided in the direction of flow of the heating medium upstream of the heat-exchanger unit 18 and downstream of the separating device 19 respectively. By means of a regulating valve 20, the desired fuel temperature can be set via the throughflow of the heating medium.

Instead of the use of gaseous fuel, which is burned inside the combustion chamber and preheated in the manner described, liquid fuel, for example oil, may also be used. To avoid permanent contamination of the heating medium with oil due to possible leakages, an appropriate oil separator is to be provided instead of the gas separator described above.

As an alternative to the heat source 7 which is shown in the exemplary embodiment and serves as a heat-recovery steam-generating plant 7 for operating a steam turbine, heat sources of a different kind may also be used for preheating the fuel; thus, for example, chemical reactors in which exothermic reactions take place, as are found in a wide variety in the chemical industry.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for preheating fuel for a firing plant which is operated with liquid or gaseous fuel, comprising the steps of: feeding the fuel to the firing plant via a feed line, having at least one heat-exchanger unit through which heat is transferred from a heating medium, which is directed in a heating circuit, to the fuel; directing the fuel in the feed line with greater pressure than the pressure at which the heating medium is directed in the heating circuit, at least in the region of the heat exchanger; and providing a separating device downstream of the heat-exchanger unit inside the heating circuit for separating fuel which has passed into the heating circuit due to leakages from the heating medium.

2. The method as claimed in claim 1, wherein the heating circuit is thermally coupled to a gas-heated heat-recovery boiler, by means of which the heating medium is held at a temperature of about 160–170° C., at most 200° C., and a pressure of about 8 to 10 bar, at most 20 bar.

3. The method as claimed in claim 2, wherein the heat-recovery boiler has a low-pressure stage, to which the heating circuit is thermally coupled.

4. The method as claimed in claim 1, wherein the fuel in the fuel line is fed with a pressure up to 50 bar.

5. The method as claimed in claim 1, wherein the fuel is heated to about 120 to 150° C., at most to 180°.

6. The method as claimed in claim 1, wherein the fuel is heated to a temperature which is controlled by a regulating valve.

7. An arrangement for preheating fuel for a firing plant which can be operated with liquid or gaseous fuel, which firing plant is connected to a feed line for the fuel, having at least one heat-exchanger unit for transferring heat from a heating medium in a heating circuit to the fuel, wherein the heating circuit is thermally coupled to a waste-heat source for heating the heating medium, wherein the pressure of the fuel in the feed line at least in the region of the heat-exchanger unit is greater than the pressure of the heating medium in the heating circuit; and wherein a separating device is connected downstream of the heat-exchanger unit in the heating circuit for separating fuel which has passed into the heating circuit due to leakages from the heating medium.

8. The arrangement as claimed in claim 7, wherein the firing plant is a combustion chamber of a gas turbine.

9. The arrangement as claimed in claim 7, wherein the waste-heat source is a heat-recovery boiler.

10. The arrangement as claimed in claim 9, wherein the heat-recovery boiler provides a low-pressure preheater or low-pressure economizer, to which the heating circuit is connected.

11. The arrangement as claimed in claim 10, wherein at least a first shut-off valve is provided in the heating circuit in the direction of flow upstream of the heat-exchanger unit and at least a second shut-off valve is provided downstream of the separating device.

12. The arrangement as claimed in claim 7, wherein the waste-heat source is a fired unit or a reaction region in which exothermic chemical reactions take place.

13. The arrangement as claimed in claim 7, wherein a regulating valve is provided which, as a function of a temperature sensor, regulates the flow through a heating-medium line and the heating of the fuel.

* * * * *